July 16, 1968     F. W. MEYER, JR     3,392,949

LOCKING DEVICES FOR PERFORATED BOARD HOOKS

Filed April 24, 1967

INVENTOR
FREDERICK W. MEYER JR.
BY
*Salvatore G. Militano*
attorney

000000000000# United States Patent Office 3,392,949
Patented July 16, 1968

3,392,949
LOCKING DEVICES FOR PERFORATED
BOARD HOOKS
Frederick W. Meyer, Jr., 8629 NW. 14th Court,
Miami, Fla. 33147
Filed Apr. 24, 1967, Ser. No. 633,263
5 Claims. (Cl. 248—220.5)

ABSTRACT OF THE DISCLOSURE

A device for locking a perforated board hook in place on a perforated board by means of a member having a pair of legs, and a peg board engaging member for securing the legs astride the shank of the perforated board hook and a collar slidably positioned over the legs and engaging the shank whereby the perforated board hook is secured against movement on the perforated board.

---

This invention relates to hooks or brackets for perforated boards commonly known as "peg boards," and is more particularly directed to locking devices for perforated board hooks or fixtures.

The conventional hooks or pegs for perforated boards are so constituted that they are mounted on a peg board by inserting one end which consists of a double curved portion into a perforation, and the hooks will remain suspended in position on the board. However, the hooks are not sufficiently secured to the perforated board to prevent the inadvertent dislodgement from their suspended position and the consequent upsetting of the articles being supported by the hooks. Attempts to correct this condition have resulted either in locking devices which permanently lock the hooks in position, which do not effectively lock the hook on the perforated boards or which completely redesign the hooks and thereby cannot be used with the conventional hooks. The present invention contemplates locking devices for perforated board hooks which can be used with any of the conventional hooks and which lock the hooks to the perforated board so securely that the locking device must be first disengaged before the hooks can be removed from or even moved on the perforated boards on which they are mounted.

Therefore a principal object of the present invention is to provide locking devices for perforated board hooks that can be applied to the board upon placing any of the conventional hooks on the perforated board in the usual manner and lock the hooks in place to prevent removal of the hooks.

Another object of the present invention is to provide locking devices that are capable of locking all of the different types of perforated board hooks now being sold so that a person need purchase only the locking device and apply it to the hooks he already has or buys separately.

A further object of the present invention is to provide locking devices for perforated board hooks that are readily detached when it is desired to relocate the hooks and just as readily attached in position to lock the hook on the perforated board.

A still further object of the present invention is to provide locking devices for perforated board hooks which are simple in manufacture and design, inexpensive in cost and most effective to lock in a secure fashion the perforated board hooks whereby articles held by the hooks cannot become inadvertently dislodged therefrom.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figure 1:
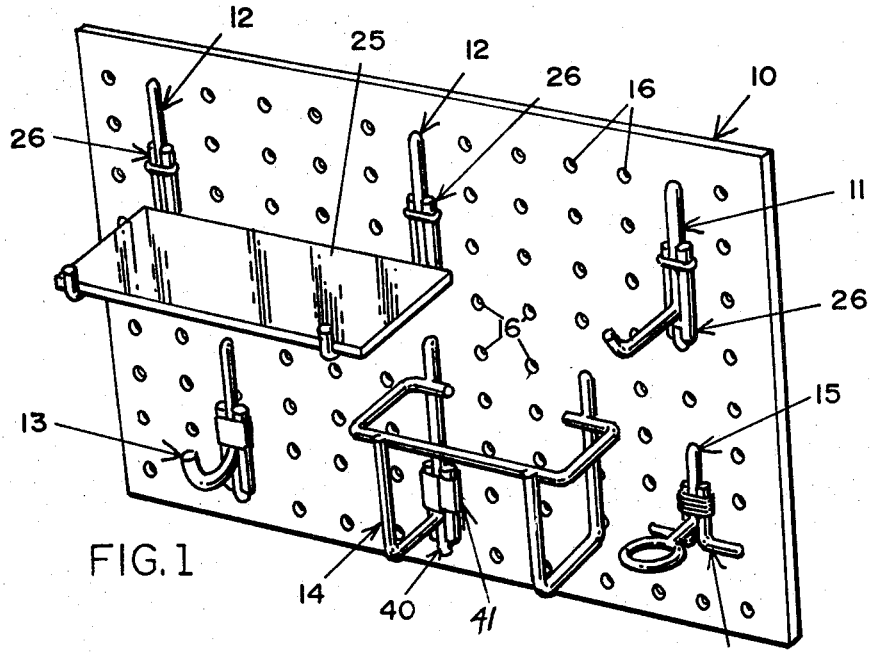
FIGURE 1 is a perspective view of a perforated board on which various types of hooks are shown mounted and locked in position by my locking devices.

Referring to the drawing wherein like numerals are used to designate similar parts throughout the several views, the numeral 10 refers to a perforated board known as a peg board on which a plurality of different conventional brackets 11–15 inclusive are mounted in position and in locked condition with my locking devices. The board 10 is provided with a plurality of symmetrically disposed and aligned bores 16. The bores 16 are adapted to receive conventional hooks or pegs of various shapes and sizes some of which are shown by way of illustration.

The shapes and sizes of the perforated board hooks are determined by the article such as a tool or a display item that it is desired to support thereon. However, all of the conventional perforated board hooks as shown by the hooks 11–15 inclusive are provided with a common shank 20 on one end of which is on identically constructed anchoring means, and at the other end a varying article supporting member.

As shown by FIGURES 2–5 inclusive, each of the hooks or pegs 11–15 inclusive consist of the vertically disposed shank 20, at the upper end of which is a horizontally disposed projection 21 of a length equal to the thickness of the perforated board 10. At the end of the projection 21 is a vertically disposed finger portion 22 which engages the rear surface of the perforated board 10 when the shank 20 is lying vertically in contact relation with the front surface of the perforated board 10 and the horizontally disposed projection 21 is received by the bore 16.

Figures 2, 3:
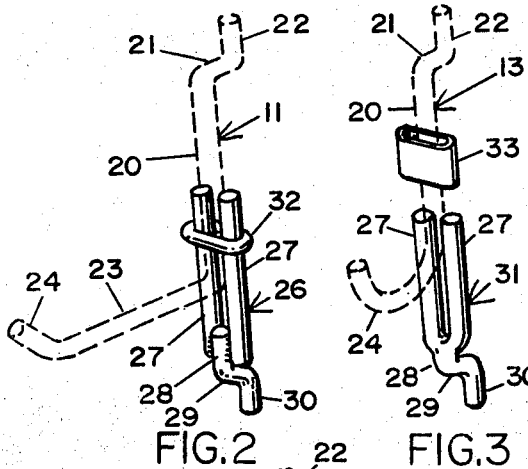
FIGURE 2 is a perspective view of my locking device with a conventional perforated hook shown by dotted lines.
FIGURE 3 is a similar view showing an alternate form of locking device on a different hook.

As shown by FIGURES 1 and 2 at the lower end of the shank 20 is an article supporting arm 23 with an end portion 24 extending at an oblique angle to prevent the article supported on the arm 23 from slipping therefrom.

As shown by FIGURE 1 the perforated board hook 12 is provided with two hooks identical in construction with the hook 11 supporting a horizontal member 25 which forms a shelf.

The conventional peg 13 shown by FIGURES 1 and 3 is provided with a semi-circular arm 24 at the lower end of the shank 20 for supporting an article thereon.

The perforated board hooks 11 and 12 are provided with locking devices 26 which are identical in construction while the locking device 31 of the perforated board hook 13 is slightly different in structure. As best shown by FIGURE 2, my locking device 26 consists of a pair of leg portions 27 mounted in spaced and parallel position with each other with the lower ends secured to a body portion 28 of my locking device 26. The body portion 28 extends vertically with a horizontal projection 29 extending from the lower end of the body portion 28 and a vertical finger 30 extending from the end of the horizontal projection 29. The locking means 28, 29, 30 of the locking device 26 are identical in construction with the locking means 20, 21, 22 of the peg 11 except that the shank 20 is longer than the body portion 28. Like the hook 11, when the locking device 26 is in position to engage the hook 11, the body portion 28 will lie along the front surface of the perforated board 10 with the bore 16 receiving the projection 29 and the vertical finger 30 engaging the rear surface of the perforated board 10. The legs 27 will lie astride the shank 20 of the peg 11 and a link or oval shaped ring 32 is slidably positioned over the shank 20 and the legs 27 to lock the peg 11 and locking device 26 together. It is apparent that the peg 11 and the locking device 26 are readily mounted on the perforated board 10 and locked thereon with ease. The conventional hook 11 is placed in position on the board 10 in the usual manner, that is by inserting the finger 22 in a bore 16 while holding the shank 20 in a horizontal position and then swinging the shank 20 downwardly until it came to rest on the front surface of the board 10. The link 32 is then slipped over the free end of the arm 24, along arm 23 and upwardly of the shank 20. The locking device 26 is then held horizontally with the finger 30 inserted into a bore 16 and legs 27 are then swung upwardly until they are astride the shank 20 when the link 32 is permitted to slide over the ends of the legs 27 to the position shown by FIGURE 2. With the various parts as shown the peg 11 cannot be removed from the perforated board 10 until the link 32 is slid upwardly beyond the legs 27 to release the locking device 26 from the hook 11.

The legs 27 of the locking device 26 are spot welded to the body portion 28 as shown by FIGURE 2 while the legs 27 of the peg lock 31 shown by FIGURE 3 are formed integrally with the body portion 28 of the locking device 31. In lieu of a link 32 for interengaging the shank 20 of the hook and the legs 27 of the locking device, there is a collar 33 that is slidably positioned therealong. The collar 33 operates and produces the same function in the same manner as the link 32.

Figure 4:
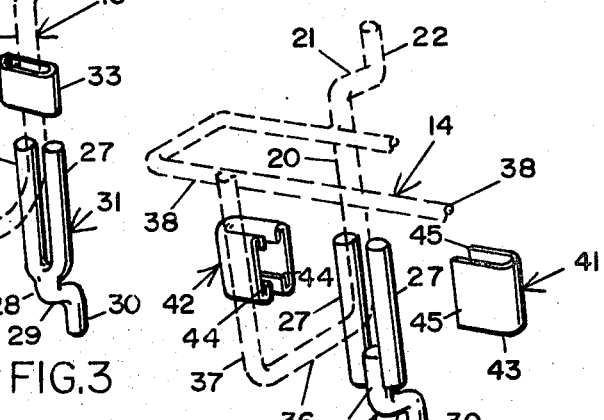
FIGURE 4 is an exploded view of a further alternate form of a locking device.

FIGURE 4 illustrates a still different perforated board bracket 14 which in turn requires an alternate form of my locking device 40. The bracket 14 is intended to hold articles such as advertising circulars consisting of a shank 20 and hook portions 21, 22 found present in all of the aforemntioned perforated board hooks except that there is a second shank 20 and hook portions 21, 22 positioned in spaced relation thereto. The shanks 20 are provided with a horizontal member 36 at the lower ends and a vertical member 37 extending vertically from the free end of the horizontal member 36. The upper end of the vertical members 37 are spot welded to a C-shaped member 38 whose ends are spot welded to the shanks 20 to form an open receptacle for receiving articles such as advertising material etc.

An alternate form 40 of my locking device identical to the locking device 26 described hereinabove differs only on the structure of the collar 41. The collar 41 consists of two separable and telescoping members 42 and 43 each of which are U-shaped in cross section with the member 42 having its upper and lower edges folded upon itself to form a slot 44 on each for receiving the edges 45 of the member 41.

The bracket 14 is mounted on the peg board 10 with the legs 27 of the locking device 40 alongside the shank 20. The two members 42, 43 of the collar 41 are then placed alongside the legs 27 and slid together to telescopically engage each other to lock the bracket 14 to the peg board 10.

Figure 5:
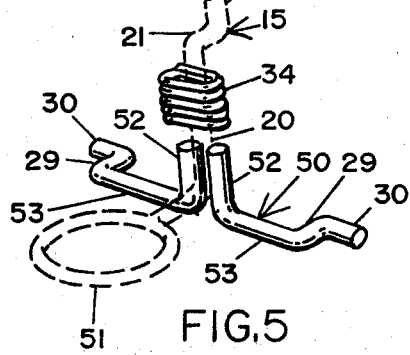
FIGURE 5 is a perspective view of a still further alternate form of my locking device.

As shown by FIGURES 1 and 5, an alternate form of my locking device 50 is shown. The bracket 15 is similar to those shown in FIGURES 2 and 3 except that the lower end of the shank 20 is provided with a circular or loop member 51 for receiving an article. The locking device 50 is provided with a pair of legs 52 which lie alongside the shank 20. The legs 52 are connected to a horizontal member 53 on the free ends of which are the projection 29 and finger 30. A collar 34 made of a length of wire coiled in an oval shape engages the legs 52 and shank 20 to lock the perforated board hook or peg 15 on the board 10. This form of locking device 50 utilizes the row of bores 16 that are in horizontal alignment with the lower portion of the shank 20 while the other forms of my locking devices utilize the next lower row of bores 16 for the locking members.

From the foregoing it is apparent that there is provided herein locking devices for conventional perforated board hooks or brackets 11, 12, 13, 14 and 15 of which these illustrate a few of the many different sizes and shapes presently being sold. These locking devices consist of a member having a pair of legs and a bore engaging member attached thereto with a collar slidably securing the legs and the shank of the bracket to lock the latter against movement or any dislodgement on the perforated board.

Having disclosed my invention, what I claim as new and desire to secure by Letters Patent is:

1. A locking device for perforated board hooks and fixtures comprising a pair of leg portions in substantially parallel and spaced relation, a body member extending from one end of said leg portions, a bore receiving projection extending from the other end of said body member, board engaging means extending from said bore receiving projection in substantially parallel relation to said body member and collar means slidably positioned on said leg portions adapted to engage the shank portion of said perforated board hooks and secure said leg portions to said shank portion whereby said perforated board hooks may be locked on a perforated board.

2. The structure as recited by claim 1 wherein said collar means comprises a pair of U-shaped members having leg portions, said leg portions of one of said U-shaped members having slotted portions receiving said leg portions of the other of said U-shaped members whereby said U-shaped members are telescopically secured together.

3. The structure as recited by claim 1 wherein said collar means comprises an oval-shaped link.

4. The structure as recited by claim 1 wherein said collar means comprises a plurality of coils of wire formed in an oval shape.

5. The structure as recited by claim 1 wherein said collar means comprises an oval thin walled metal member.

References Cited

UNITED STATES PATENTS

| | | | |
|---|---|---|---|
| 2,961,724 | 11/1960 | Alling | 24—73 |
| 3,069,122 | 12/1962 | Babajoff | 248—223 |
| 3,241,799 | 3/1966 | Terlinde | 248—225 |
| 3,244,391 | 4/1966 | Brunette | 248—225 |
| 3,272,468 | 9/1966 | Wittrock | 248—225 |

JOHN PETO, *Primary Examiner.*